United States Patent
Höfle et al.

(10) Patent No.: US 7,197,891 B2
(45) Date of Patent: Apr. 3, 2007

(54) VEHICLE CAB COOLING SYSTEM

(75) Inventors: Jorg-Jens Höfle, Seeheim-Jugenheim (DE); Gunnar Dietrich, Mannheim (DE)

(73) Assignee: Deere & Company, Moline, IL (US)

( * ) Notice: Subject to any disclaimer, the term of this patent is extended or adjusted under 35 U.S.C. 154(b) by 136 days.

(21) Appl. No.: 11/040,160

(22) Filed: Jan. 21, 2005

(65) Prior Publication Data

US 2005/0178137 A1 Aug. 18, 2005

(30) Foreign Application Priority Data

Jan. 21, 2004 (DE) .................... 10 2004 003 237

(51) Int. Cl.
*B60H 1/32* (2006.01)

(52) U.S. Cl. .............. 62/244; 62/428; 62/506

(58) Field of Classification Search ............. 62/244, 62/428–429, 507–508; 165/42–43
See application file for complete search history.

(56) References Cited

U.S. PATENT DOCUMENTS

| | | | | |
|---|---|---|---|---|
| 2,922,293 A | * | 1/1960 | Peix ................ | 62/243 |
| 3,670,808 A | * | 6/1972 | Wait, Jr. .............. | 165/42 |
| 4,144,719 A | * | 3/1979 | Williams et al. ........... | 62/239 |
| 4,641,502 A | * | 2/1987 | Aldrich et al. .............. | 62/244 |
| 4,982,583 A | * | 1/1991 | Matsuda et al. ............. | 62/244 |
| 5,184,474 A | * | 2/1993 | Ferdows ................. | 62/244 |
| 6,161,609 A | | 12/2000 | Ahn .................. | 165/41 |

FOREIGN PATENT DOCUMENTS

| | | |
|---|---|---|
| DE | 38 02 356 A1 | 8/1989 |
| DE | 40 33 207 A1 | 4/1992 |
| DE | 93 19 874.4 U1 | 5/1994 |
| DE | 295 04 132 U1 | 9/1996 |
| DE | 195 35 291 C1 | 3/1997 |
| DE | 101 59 589 A1 | 6/2003 |
| EP | 1 342 598 A1 | 9/2003 |

* cited by examiner

*Primary Examiner*—William E. Tapolcai

(57) ABSTRACT

A cooling system cools the air for a cab of a vehicle. The system includes a compressor and/or an evaporator, a condenser, an air guidance system and connecting lines. The condenser can be connected with the compressor or the evaporator by means of the connecting lines. Air for the cooling of the condenser can be conducted to the condenser by means of the air guidance system. The condenser installed in a limited or reduced construction volume and is located close to the cab without increasing the dimensions of the engine hood.

7 Claims, 4 Drawing Sheets

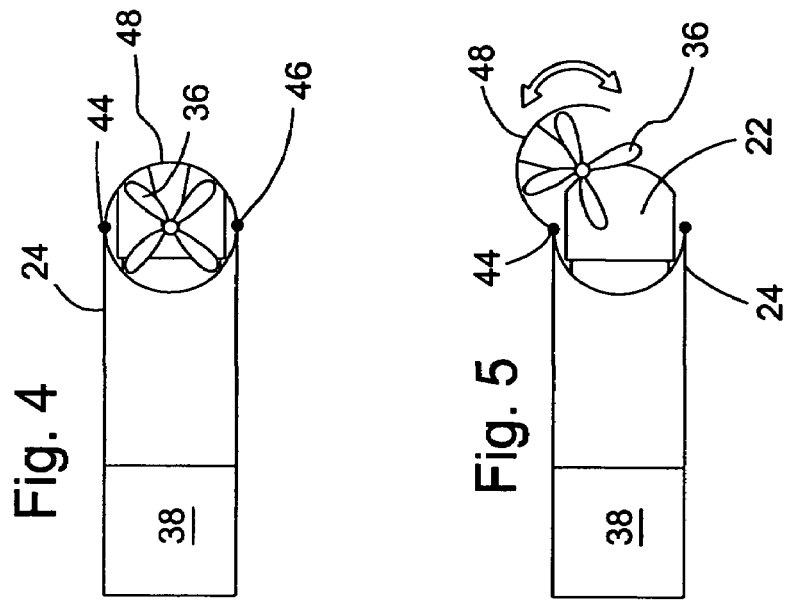
Fig. 4
Fig. 5
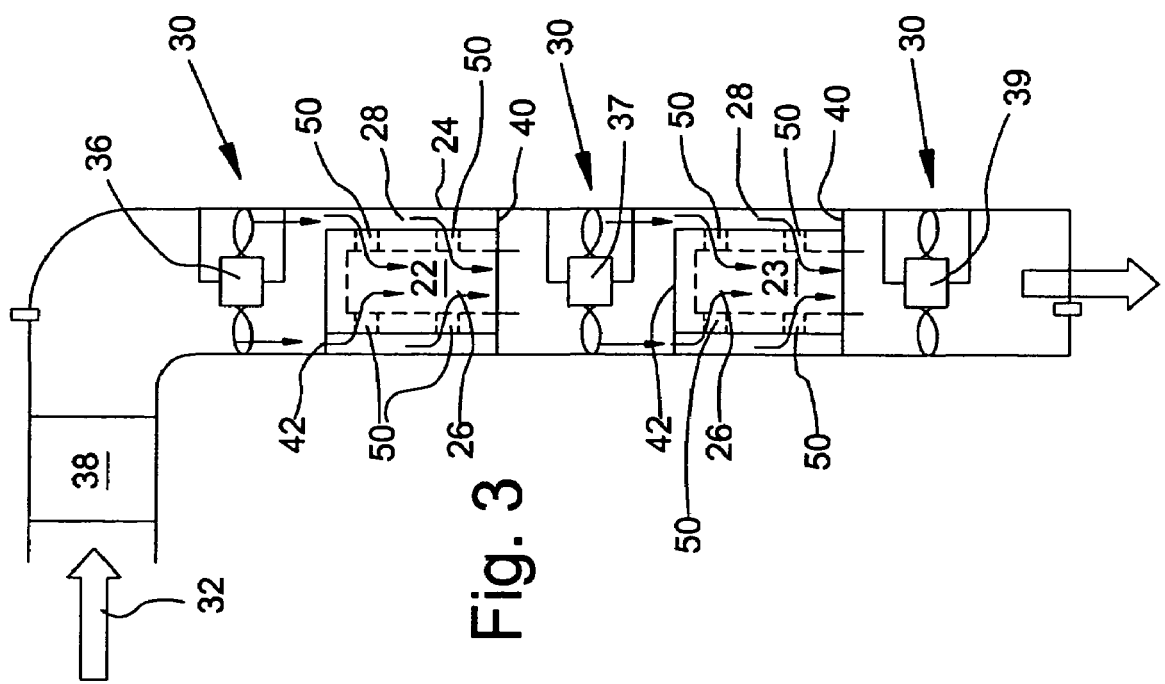
Fig. 3

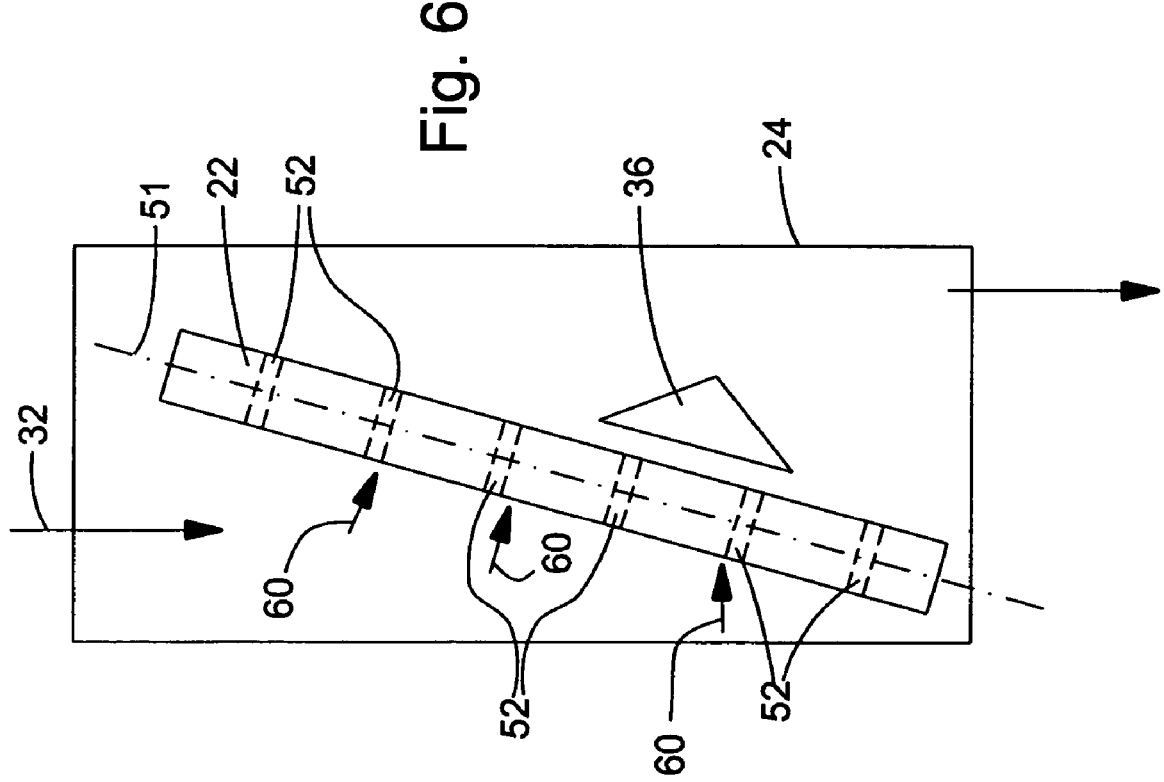

VEHICLE CAB COOLING SYSTEM

BACKGROUND

The present invention relates to a cooling system for the cab of a vehicle such as an agricultural or industrial utility vehicle, and more particularly to a cooling system having a compressor and/or an evaporator, a condenser, an air guidance system and connecting lines.

Vehicle cab cooling systems are well known. For example, air conditioning systems are used in passenger vehicles, trucks and agricultural vehicles. In such systems heat is transferred by a refrigerant that changes from liquid to gas and the reverse, and thereby absorbs and transfers heat. In a evaporator usually in a vehicle cab, the refrigerant is converted from liquid to gas to absorb and remove heat from the cab. The evaporated refrigerant is condensed or compressed by a compressor so that it can again be converted to a liquid in the condenser. This heat is usually transmitted by the condenser to the ambient air. It is also known to operate an air conditioning system with R152a or CO2 as coolant. If CO2 is used as coolant, the condenser is designated as a gas cooler.

Condensers are normally located near to the vehicle cooler, where ambient air is drawn in by a ventilator, through the condenser and through the vehicle cooler, whereby the heat liberated in the condenser can be transmitted to the air.

The space available in a vehicle for a cooling system is limited. Yet, cooling systems with increased cooling capacity may require new designs in order to accommodate the condenser. This can require a larger engine hood whereby the sightlines for the operator may be reduced over a larger range of angles.

SUMMARY

Accordingly, an object of this invention is to provide a vehicle cab cooling system with a condenser located in close proximity to the cab.

A further object of the invention is to provide such a vehicle cab cooling system wherein the condenser is configured so that no significant increase in the engine hood dimensions is required.

These and other objects are achieved by the present invention, wherein the condenser is close to the vehicle cab, instead of being located close to the engine cooler, and instead of being located under the engine hood. This permits short connecting lines between the evaporator and the condenser and reduces manufacturing costs.

The condenser may be prism-shaped, rectangular or cylindrical, or may have a tubular shape. Preferably, the condenser is a hollow cylinder, so that it can be cooled by air blown both around and through the hollow cylinder. Also, the condenser is generally arranged vertically and is an elongated hollow cylinder, so that the condenser, in a system close to the cab, appears similar to an exhaust pipe. The condenser can be oriented with its longitudinal axis at an angle to the vertical of less than 45°. Several, three for example, rectangular-shaped condensers may be connected to each other and oriented at a small angle with respect to the vertical.

Preferably, the condenser has at least some hollow cylinder sections with several radially extending channels which connect the interior of the hollow cylindrical condenser with its exterior. Cooling air can be conducted by an air guidance system to the exterior or the interior of the condenser. A part of the air can be conveyed through the channels into the interior or the exterior of the hollow cylinder and can be conducted away from it. The condenser may be ring-shaped which provides a high degree of efficiency.

Alternatively, the condenser could have a generally elongated shape. Such a condenser could be exposed to a flow of air in its longitudinal direction. The condenser could include longitudinal or transverse channels through which air can be conducted for heat exchanging. The condenser could be curved in its longitudinal direction, so that it can conform to the shape of other components.

The condenser could be enclosed in a housing with cylindrical, rectangular or prismatic-shaped sections. Preferably, the housing conforms to a part of the air guidance system so that the effectiveness of the air flow around or through the condenser can be increased further by means of the housing or the air guidance system.

The condenser may be arranged in the housing so that a longitudinal axis of the condenser is at an angle of less than 90° with respect to a longitudinal axis of the housing. A condenser or several condensers are arranged within the housing at a small inclination to the vertical with respect to the housing. Air flow through such a condenser could be directed transverse to its longitudinal axis.

Air could flow generally in the horizontal direction through the condenser or transverse to its longitudinal axis. A ventilating system could be provided for conducting air through one part of the condenser. Such a ventilating system could be a blower arranged immediately ahead of or downstream of the condenser, in order to blow air through or draw air from the condenser.

Preferably, a ventilating system, such as a fan or a ventilator, draws in air and conducts it to the condenser via the air guidance system. Preferably the air drawn in is ambient air coming from the surroundings.

The ventilating system could be located upstream and/or at the upper end of a vertically oriented condenser. Correspondingly, the ventilating system could draw in ambient air, and force the air along the condenser or through the condenser. A ventilating system can pull or push in air to the condenser.

The housing could include an opening with a flap through which components in the housing are accessible for cleaning and/or maintenance. But, preferably the housing is a two-piece or multi-piece component that can be opened or closed for access. The housing can include a part which can be removed, folded away or pivoted away and fastened to another part of the housing. A two-piece system is preferably divided along a longitudinal direction of the housing.

A ventilating system could be fastened to one part of the housing and a condenser could be fastened to another part of the housing. Thus, a plurality of ventilating systems could be arranged in the direction of air flow ahead of and downstream of the condenser. A ventilating system may be attached to the housing part which is opened or folded away. The condenser may be attached to the other stationary part of the housing, so that the ventilating system and the condenser are separated and are easily accessible.

Preferably, a ventilating system is arranged downstream of the condenser to increase the efficiency of the flow of air around or through the condenser. Preferably, the system may include several ventilating systems and several condensers alternately arranged one behind the other.

The condenser and housing may be arranged at a forward and/or side location on the vehicle. Preferably, the condenser and housing are arranged near to an upright post of the cab in order to reduce interference with the sightlines of an operator, especially if the condenser projects from the engine hood.

In the case of agricultural vehicles, the ambient air may contain dust or small particles of straw or the harvest material which lodge on or in the condenser and quickly reduce efficiency. For this purpose, the system includes a filter system for cleaning ambient air flow. The filter system could be provided with small turbolator tubes that operate according to a cyclone principle.

BRIEF DESCRIPTION OF THE DRAWINGS

FIG. 3 is a simplified sectional side view of a further embodiment of a condenser system;
FIG. 4 is a plan view of the condenser system of FIG. 3 in a first condition;
FIG. 5 is a plan view of the condenser system of FIG. 3 in a second condition;
and
FIG. 6 is a sectional view of a further embodiment of the present invention.

DETAILED DESCRIPTION

Figure 1:
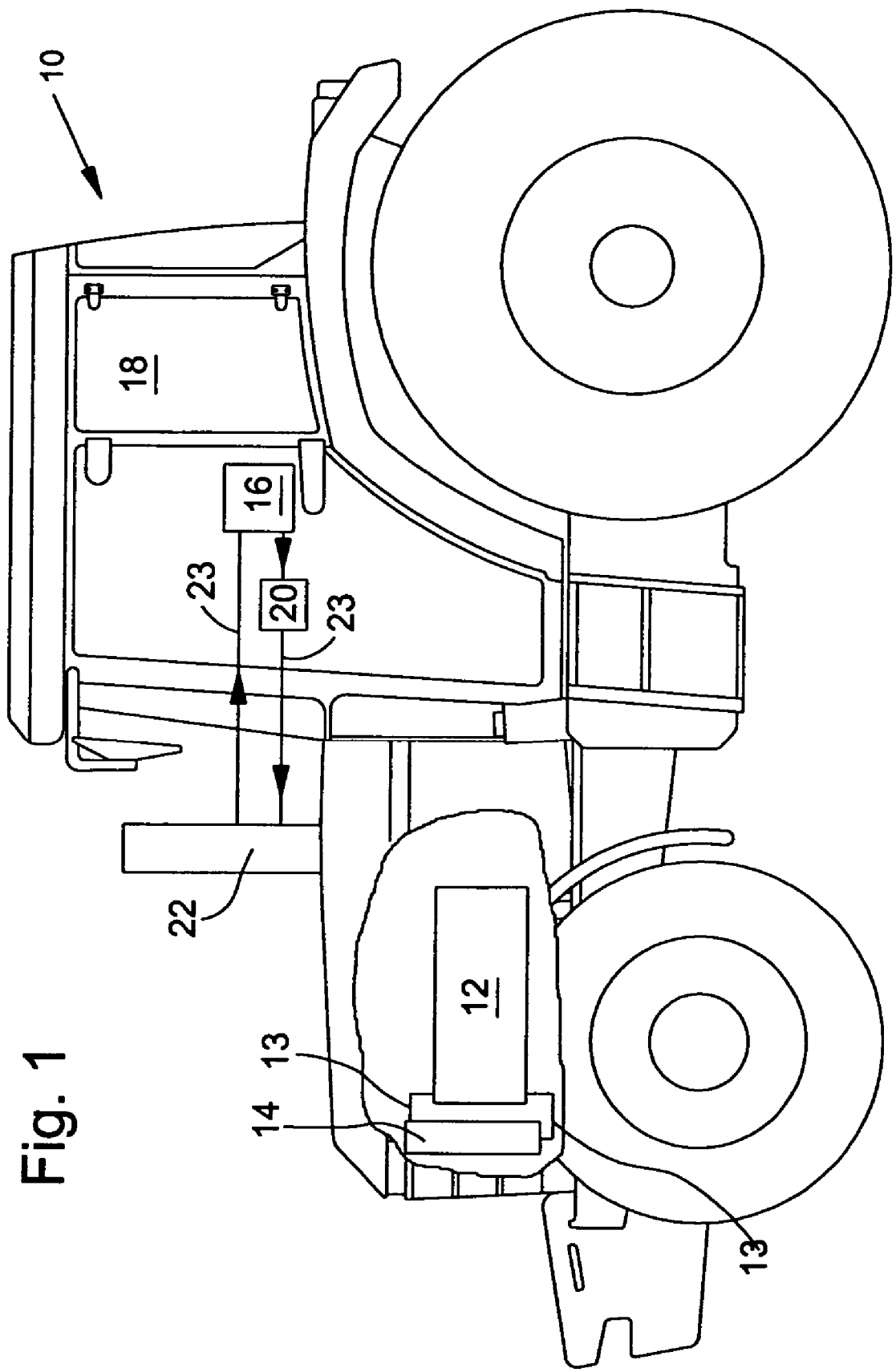
FIG. 1 is a side view of an embodiment of the invention.

Referring to FIG. 1, an agricultural utility vehicle, such as a tractor 10, is equipped with an air cooling system. The tractor 10 has a cab 18 and is driven by an internal combustion engine 12 which is cooled by a high temperature cooling circuit 13 which includes a cooler 14.

The air cooling system includes an evaporator 16 arranged in the cab 18. The coolant circulating in the system is evaporated in the evaporator 16 and thereby removes heat from the cab 18. The coolant is compressed in the compressor 20 and is condensed in the condenser 22. The heat liberated thereby can be delivered to the ambient air. The coolant is conducted in its circuit in the connecting lines 23.

Figure 2:
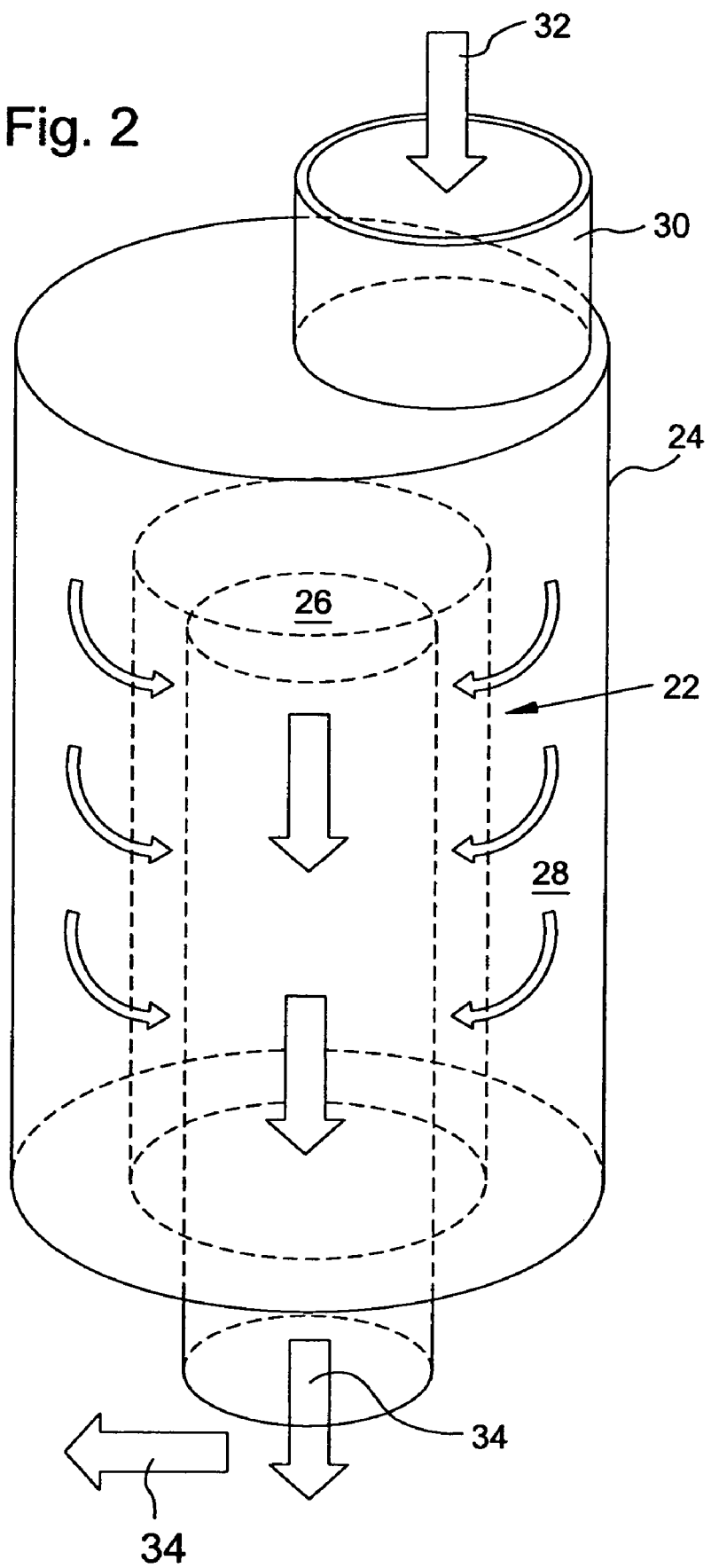
FIG. 2 is a perspective view of a condenser of the embodiment of FIG. 1.

Referring now to FIG. 2, the condenser 22 is configured as a hollow cylinder which is arranged in a generally cylindrical housing 24. The condenser 22 includes several radially extending channels (not shown) which connect the interior 26 of the condenser 22 with its exterior 28. The housing 24 forms one part of the air conduction system which conducts ambient air to the condenser 22. The ventilating system 30 draws in ambient air, as indicated by arrow 32 and guides the air into the exterior region 28 of the condenser 22 which is between the housing 24 and the condenser 22. The air in the exterior region 28 reaches the interior 26 of the condenser 22 through the radial channels (not shown), and is conducted away therefrom as indicated by arrows 34.

Referring now to FIG. 3, a housing 24 encloses two condensers 22, 23 and a ventilating system 30 containing three ventilators 36, 37 and 39. Ambient air is drawn in by the ventilators in direction 32 and cleaned, at least coarsely, by the filter 38. The condensers 22, 23 are configured in the form of hollow cylinders, arranged in a series circuit or one behind the other with respect to the flow of coolant.

The air drawn in by the ventilators 36, 37, 39 is precleaned by filter 38 and conducted into the exterior region 28 of the first hollow cylindrical condenser 22. This first exterior region 28 is bordered on the downstream side by the ring-shaped diaphragm 40, so that pressurized air is conducted into the interior region 26 of the condenser 22 through radial channels 50 in the condenser 22. The air is then conducted (with the aid of the second ventilator 37) around the exterior 28 of condenser 23. This exterior region 28 is also bordered by a second ring-shaped diaphragm 40, so that pressurized air is also conducted through the radial channels 50 of the condenser 23 into the interior region 26 of condenser 23. Finally, ventilator 39 helps exhaust air out of the housing 24. The interior region 26 of the condensers 22, 23 is sealed by a cover plate 42, so that the pressurized air does not flow directly into the interior regions 26, but instead must flow over the exterior region 28 and through the radial channels 50 of the condensers 22, 23.

As an alternative to radially operating condensers 22, 23, one or two condensers (not shown) which operate in the axial direction could be provided, and such condensers could be configured in cylindrical, rectangular or prismatic shape, and could conduct air along an axis of the cylinder.

Referring now to FIG. 4, the housing 24 encloses the filter 38, the ventilators 36 and the condensers 22. A cylindrical housing section 48 is coupled by a hinge 44 to the other part of the housing 24 and is held in a closed or locked position by a lock 46. The hinge 44 has a longitudinal axis.

Referring now to FIG. 5, the housing section 48 is pivoted on hinge 44 to an open position so that the ventilators 36 and condensers 22 are easily accessible for purposes of maintenance or cleaning. The ventilators 36 are fastened to the housing section 48 and the condensers 22 are fastened to the other stationary part of housing 24.

FIG. 6 shows a portion of the housing 24 which encloses the condenser 22. The ambient air 32 drawn in from above by the ventilating system (not shown) and conducted into the housing 24. The condenser 22 has a longitudinal axis 51. The housing 24 has a longitudinal axis which is parallel to arrow 32. The condenser 22 is arranged in the housing 24 so that its longitudinal axis 50 extends at an angle to the longitudinal axis of the housing 24. Air flows in the housing 24 transverse to the condenser axis 51 and into channels 52 in the condenser 22 as indicated by arrows 60. A further ventilator 36 is provided downstream of the condenser 22, which supports a continuous flow of air through the condenser 22.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle cab cooling system, the system having a compressor and an evaporator, a condenser, an air guidance system, and connecting lines connecting the condenser to the compressor and the evaporator, and the air guidance system conducting cooling air to the condenser, characterized by:
   the condenser being located close to the cab;
   the condenser including a plurality of radially extending channels, the channels connecting an interior region of the condenser with an exterior of the condenser; and
   the air guidance system conducting cooling air to the interior and exterior of the condenser, and a portion of the cooling air being conducted through the channels.

2. The cooling system of claim 1, wherein:
   the condenser includes sections, has a hollow cylindrical shape and is oriented not more than 45° with respect to a vertical axis.

3. The cooling system of claim 1, wherein:
the condenser is arranged together with a housing near to an upright post of the cab and projects outward from an engine hood of the vehicle.

4. The cooling system of claim 1, wherein:
the condenser has an elongated shape, the condenser includes air conducting channels extending therethrough, and the housing is curved in a longitudinal direction.

5. The cooling system of claim 1, wherein:
the condenser comprises a hollow cylindrical structure received within a cylindrical housing, the housing being spaced outwardly apart from the condenser and forming a portion of the air guidance system.

6. The cooling system of claim 5, further comprising:
a ventilating system mounted in the housing and conveying ambient air to the condenser via the housing.

7. The cooling system of claim 6, wherein:
the ventilating system is arranged upstream of the condenser and is oriented generally vertically.

* * * * *